(No Model.) 9 Sheets—Sheet 2.

C. ANDERSON.
SULKY PLOW.

No. 399,814. Patented Mar. 19, 1889.

Witnesses
E. J. Nottingham
G. F. Downing

Inventor
Chas Anderson
By his Attorney
H. A. Suzman (No Model.) 9 Sheets—Sheet 5.

C. ANDERSON.
SULKY PLOW.

No. 399,814. Patented Mar. 19, 1889.

Fig. 5.

Witnesses,
C. J. Nottingham
G. F. Downing

Inventor
Chas Anderson.
By his Attorney
H. A. Seymour (No Model.) 9 Sheets—Sheet 6.

C. ANDERSON.
SULKY PLOW.

No. 399,814. Patented Mar. 19, 1889.

Witnesses
E. J. Nottingham
G. F. Downing

Inventor
Chas. Anderson
By his Attorney
H. A. Seymour (No Model.) 9 Sheets—Sheet 7.

C. ANDERSON.
SULKY PLOW.

No. 399,814. Patented Mar. 19, 1889.

Witnesses
E. J. Nottingham
G. F. Downing

Inventor,
Chas Anderson.
By his Attorney
H A Seymour

UNITED STATES PATENT OFFICE.

CHARLES ANDERSON, OF SOUTH BEND, INDIANA, ASSIGNOR TO THE SOUTH BEND IRON WORKS, OF SAME PLACE.

SULKY-PLOW.

SPECIFICATION forming part of Letters Patent No. 399,814, dated March 19, 1889.

Application filed November 1, 1888. Serial No. 289,736. (No model.)

*To all whom it may concern:*

Be it known that I, CHARLES ANDERSON, of South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

My invention relates to an improvement in sulky-plows.

The primary object is to provide a plow the beam of which may be shifted in position relative to the wheels from right to left, or to the front or rear, in order to effectually meet the varied conditions of the work to be done.

A further object is to provide a simple and novel lever mechanism for raising or lowering the plow and regulating the inclination of the furrow-wheel without impeding the progress of the plow.

A further object is to provide mechanism for regulating the depth of cut of the share, the width of furrow, and for assisting the turning and lateral movement of the plow.

A still further object is to provide means whereby the driver may simultaneously unlock the tongue and the guide or caster wheel, whereby a double joint, as it were, may be formed in the plow to enable it to be turned by a comparatively few steps of the draft-animals and at the same time in the smallest possible space.

With these objects in view my invention consists in certain novel features of construction and combinations of parts, as will be hereinafter described, and pointed out in the claims.

In the accompanying drawings, Fig. 6 is a transverse section on line $y\ y$ of Fig. 4. Fig. $6^a$ is an enlarged detached view of the caster-wheel with its connected parts. Fig. 7 is a longitudinal section through the hub. Fig. $7^a$ is a plan view of the caster-wheel and parts. Figs. 8, 9, and 10 are detached views of the shifting mechanism.

A represents the plow-beam, preferably cast of metal, with a ribbed upper and lower edge to afford proper strength. At its rear end the beam is bent downward to form a standard, A', for the attachment of the plow proper. The forward end of the beam is supported upon a pair of wheels, and these wheels are carried on a carriage, now to be described.

A box, B, constitutes the backbone of the carriage. This box is rounded on the upper face and flat on its bottom with flanged edges, and has a bored center, $b$. The flanges of this box are extended sufficiently at one end to form shoulders $b'$, and integral with one end of the box B, and projecting laterally with a slight inclination downward and backward, is a tapered skein, $b^2$, having a bore, $b^3$, through its center. On this skein a tapered hub, C, or one section of the sectional crank-axle, is loosely mounted, a bolt, having a washer on one end for holding the hub in place, being inserted through the skein, where it is held by a nut screwed on the other end. A web, C', is formed integral with one side of the hub, and the outer end of this web terminates in an outwardly-projecting ribbed axle-supporting arm, $C^2$, and on the end of the latter axle-box $C^3$ is formed, and in the bore of this axle-box annular recesses $c\ c'$ are cut out to receive, respectively, the shoulder $c^2$ of spindle $C^4$, and the end, $d$, of the loosely-mounted sleeve D, which carries the wheel E. This sleeve is screw-threaded on its outer end and provided with an annular ring, $d'$, at the other end. The outer end bears on the ring $d'$, and the pin $d^2$ enters a notch in the hub of the wheel, whereby the latter is locked to the sleeve. The parts are assembled by inserting the spindle in the hub-box and screwing a nut on its end and the wheel is held on the loosely-mounted sleeve D by the cap D', a packing-ring, $d^4$, being inserted between the hub of the wheel and the sleeve, if necessary.

The other section, F, of the crank-axle, having a boss, $f$, thereon to hold it in place, is loosely supported in box B, and on the outer end of this axle a ribbed arm, F', projects laterally. The outer end of this arm is provided with an axle-box, $f'$, and wheel E' is mounted on a sleeve supported by a suitable spindle, just as furrow-wheel E is, only the spindle in this case after passing through the box projects beyond it or inwardly a short distance to furnish a support for the foot-lever G. The latter is held onto the spindle by means of a nut, and it is preferably placed so as to project in an opposite direction from the arm F' to furnish the best leverage, it having engagement with said arm, or rather with the box on the arm, through the instrumentality of a rigid dog on its side which enters one of the notches on this box. There are several of these notches, so that the foot-lever may be slightly changed in position relative to the arm to which it is locked, if desired. The other end of the section F of the crank-axle projects through and beyond the box B, and this projecting end is given an angular formation, $h$. A hand-lever, H, is provided on one end with a corresponding angular opening adapted to receive the end of the section F, so that the two are locked together. The hand-lever is located in such proximity to the driver as to be readily grasped, and it is provided with the usual spring-latches, $h'$, and connected finger-levers $h^2$, only instead of having but one of these it is provided with two—one on each side—the finger-lever for one projecting forward and the other backward. Two sectors, H' and H², the former rigid with box B and the other movable, are located on either side of the hand-lever just below the spring-latches, and the latches are adapted to engage the teeth of these sectors. The rigid sector is provided with a pair of laterally-projecting ears, $h^3$, adapted to rest on shoulders $b'$ of box B, to which they are held fast by bolts or similar devices, so that the sector is upright and perfectly rigid. Over a portion of the edge of this sector H' rack-teeth $h^4$ are furnished, and upon the balance of the upper edge ratchet-teeth $h^5$ are provided. The purpose of this arrangement will be adverted to later.

The smaller and movable toothed sector H² is loosely mounted on the end of the section F of the sectional crank-axle just outside of e angular portion $h$, and this sector is held in place by a suitable nut. Stops $h^8$ on the ends of the sector prevent the latch from passing beyond the edges of the latter, and a lug, $h^9$, on the rigid sector limits the movement of sector H² in one direction. This movable sector is connected to the web C' by means of a link, K, pivoted on a pintle held by a pair of ends, $h^6$, projecting from the web back of axle-box C³. The link K is curved to avoid striking any of the parts, and is pivotally connected to the movable sector by a pin, $h^7$.

Figure 1:
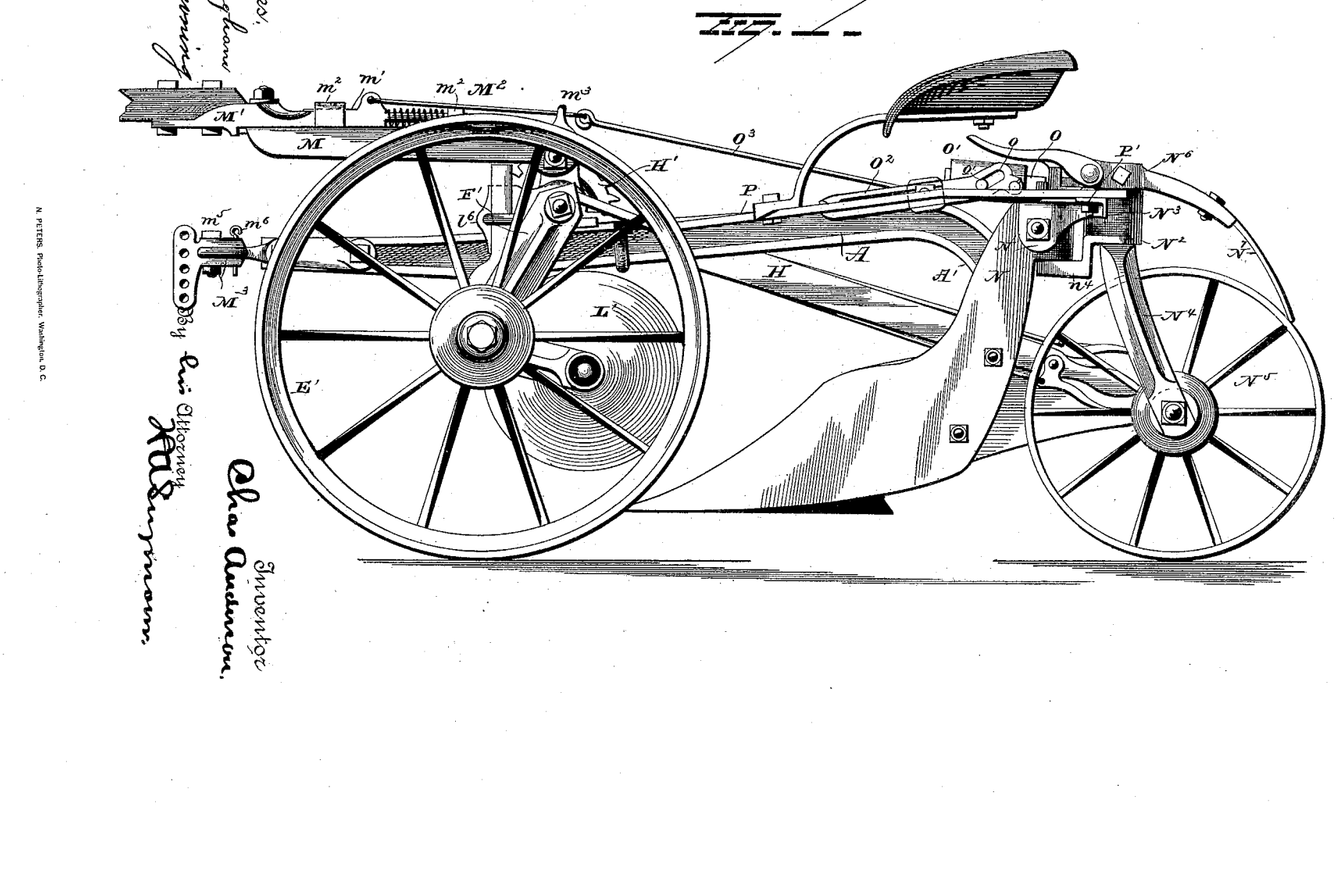
Figure 1 is a view in elevation of the plow.
Figure 2:
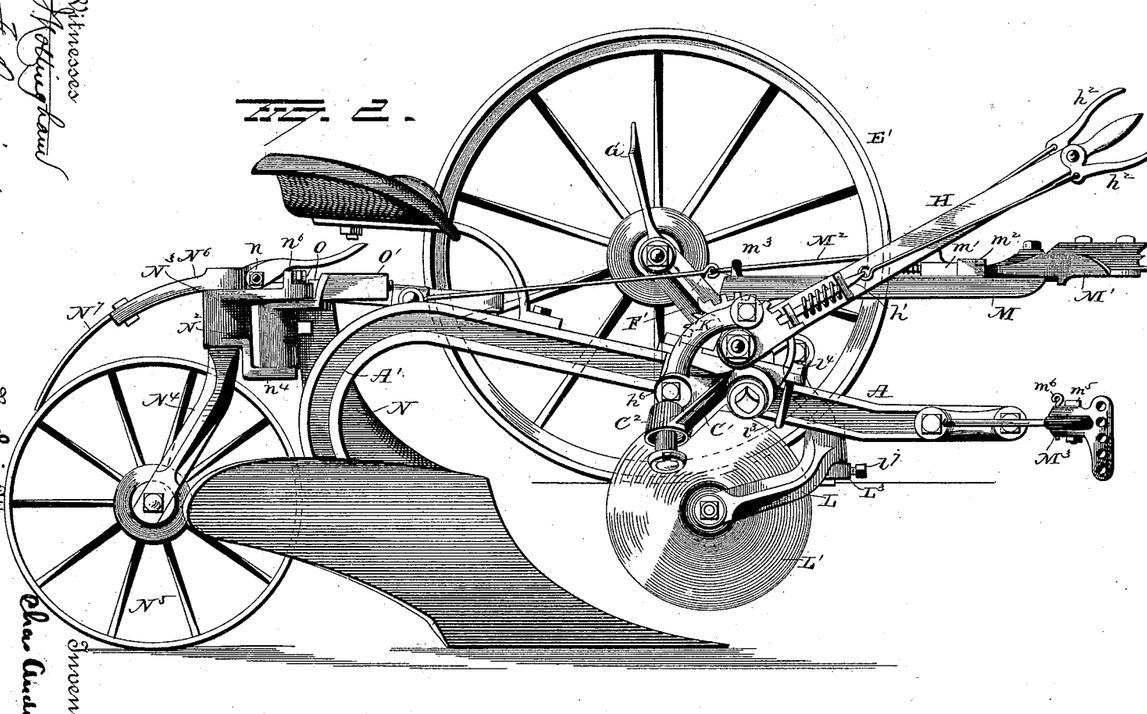
Fig. 2 is a side elevation with share in position of plowing.
Figure 3:
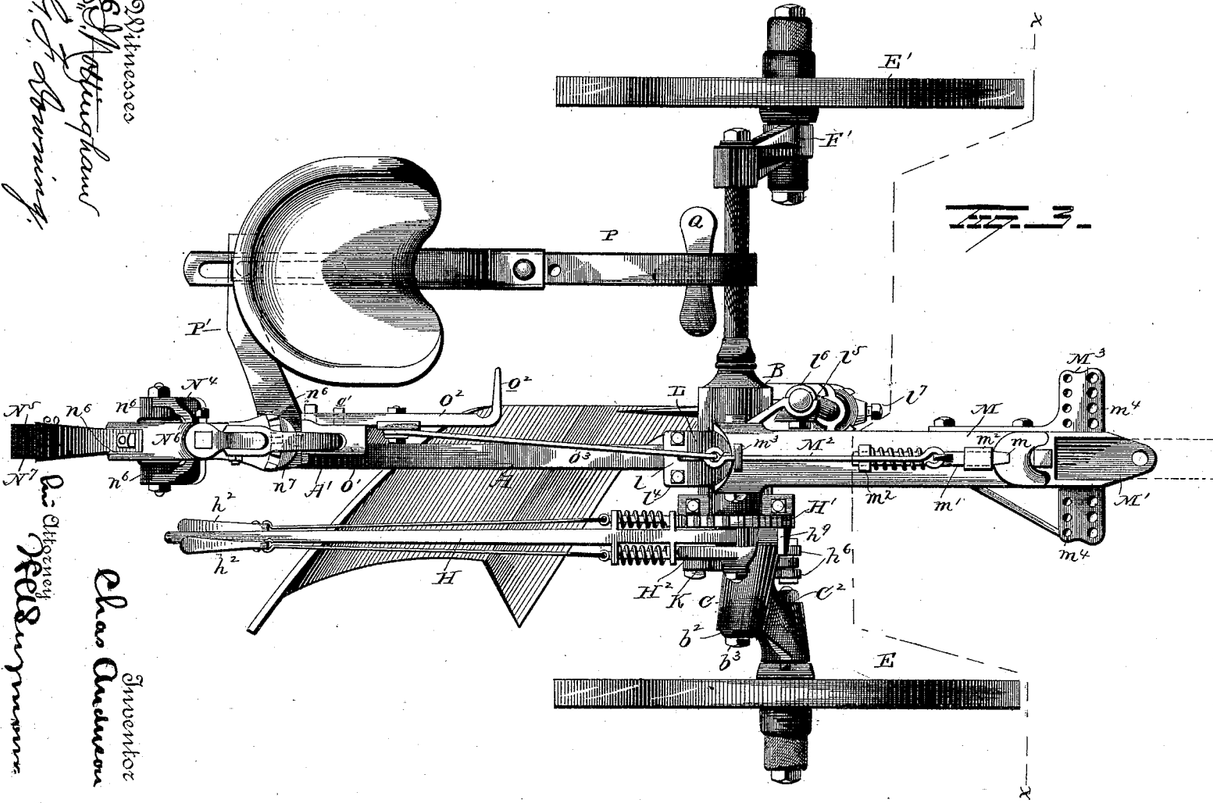
Fig. 3 is a plan view.
Figure 4:
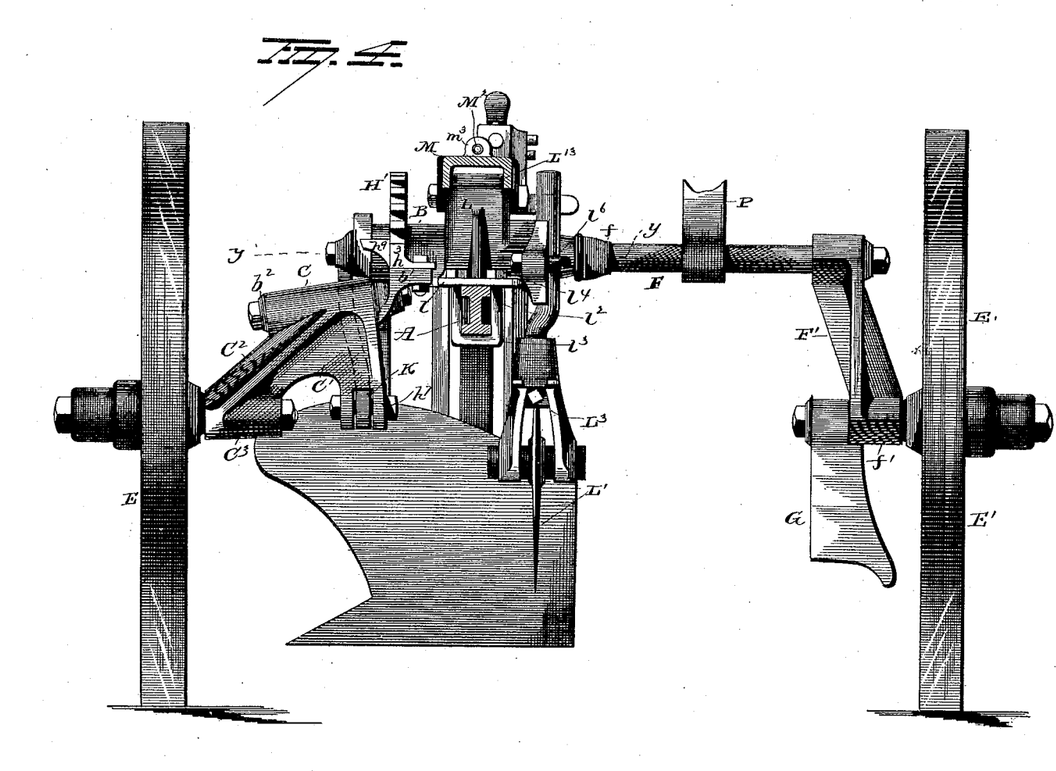
Fig. 4 is a transverse section on line $x\ x$ of Fig. 3, with plow-share elevated.
Figures 4, 5, 6, 7:
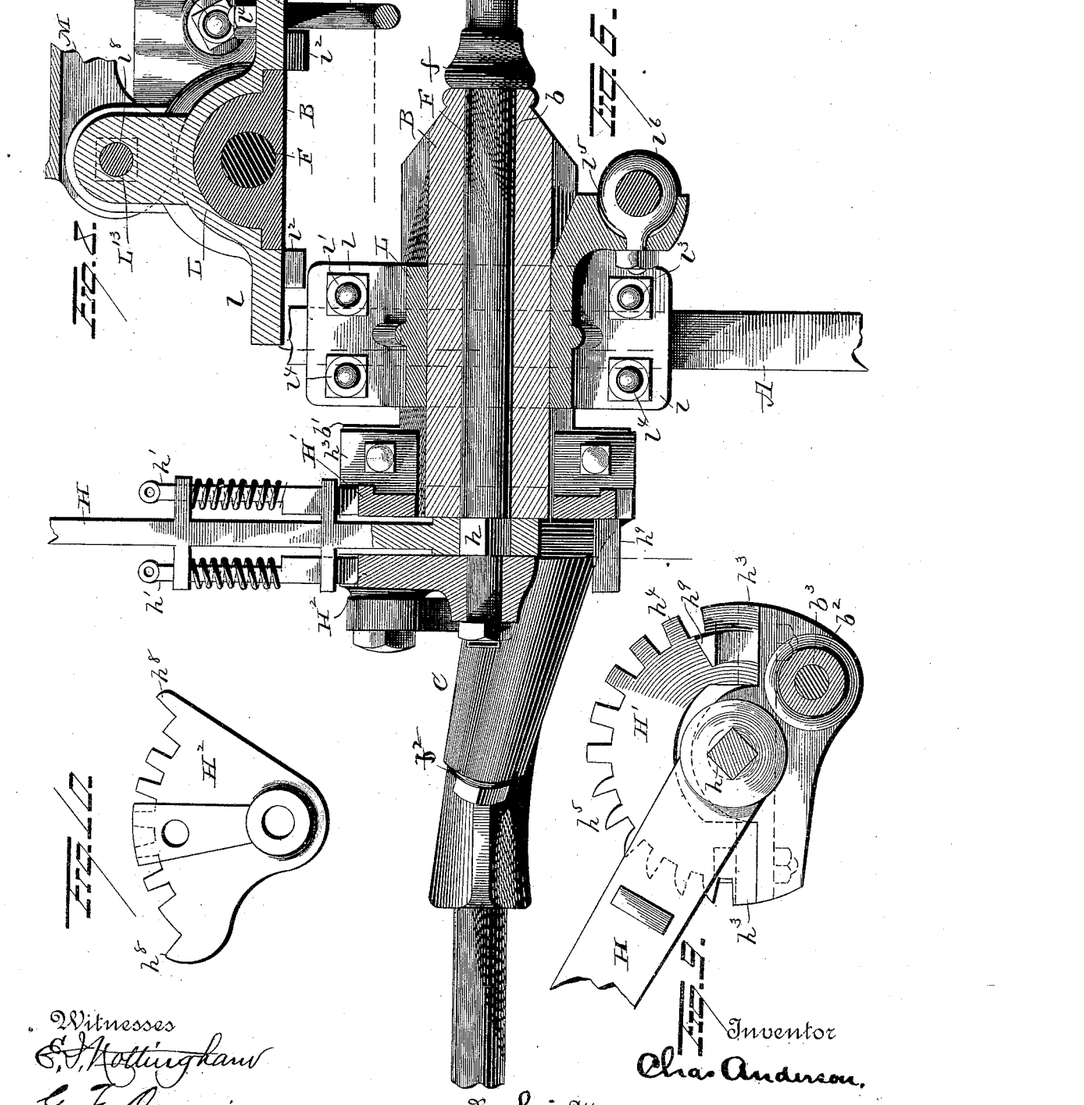
Figure 5:
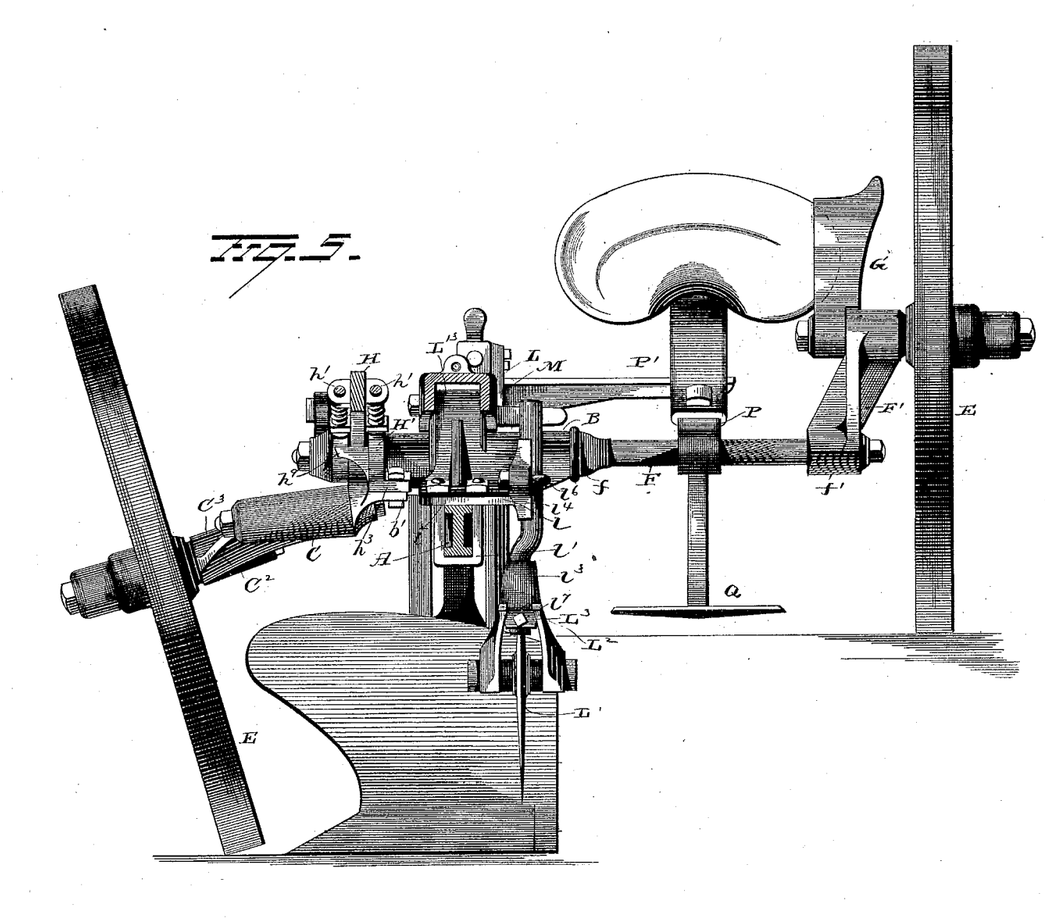
Fig. 5 is a similar view on same line with plowshare in working position.
Figures 6, 7, 7A:
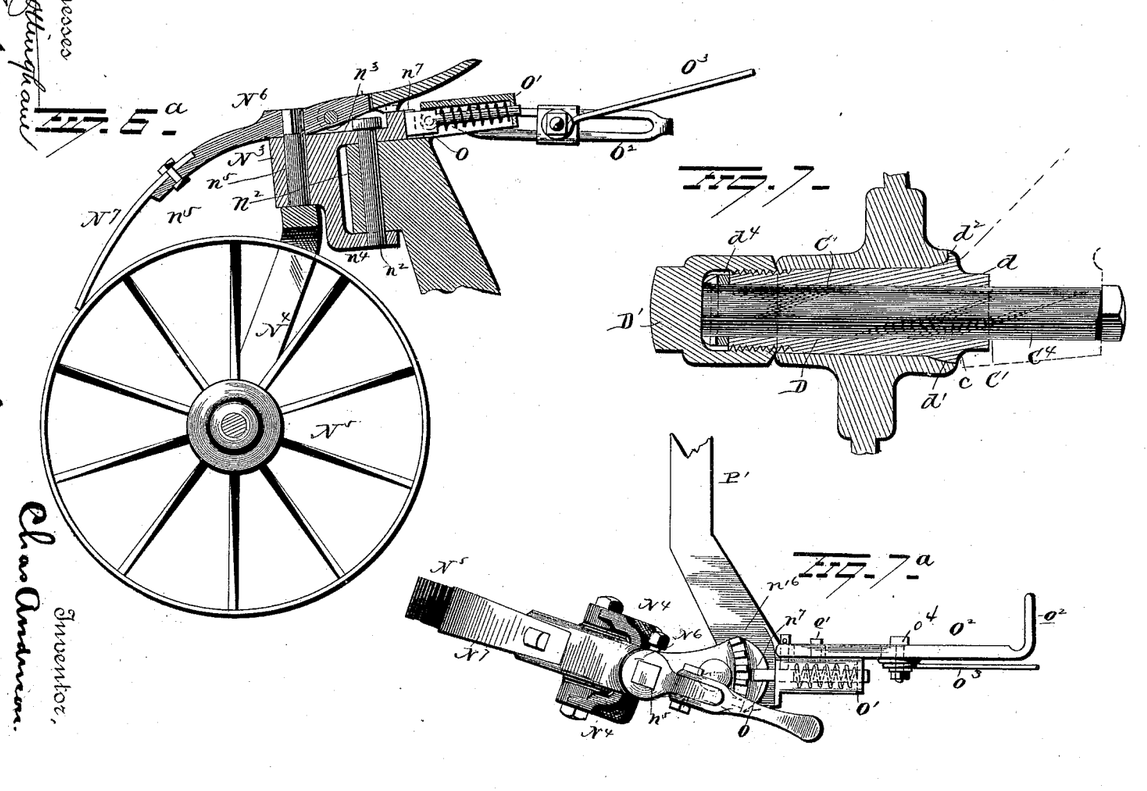
Figures 11, 12, 13, 14:
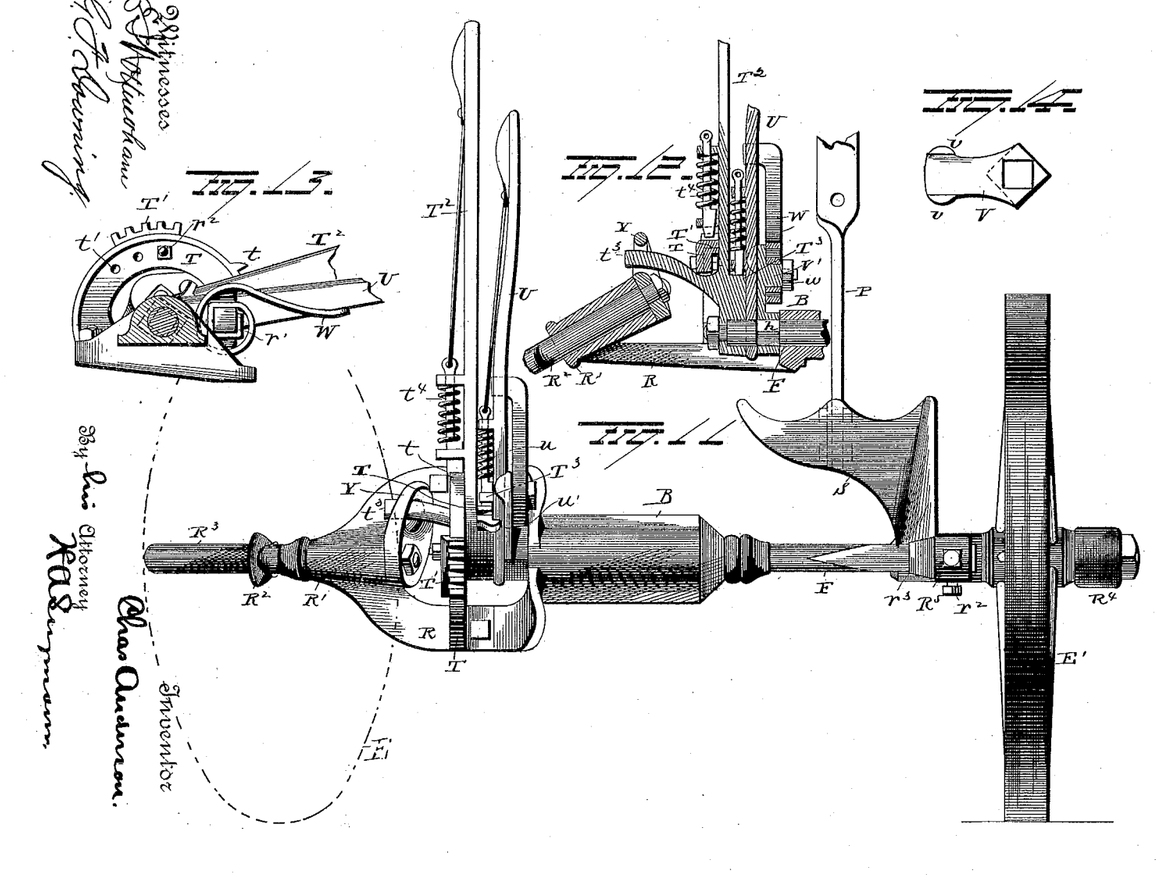
Fig. 11 is a perspective view of a modified construction.
Fig. 12 is a section through the carriage.
Figs. 13 and 14 are detached views of parts.

Now, in operating the lever H, dependent upon the finger-lever used, the depth of the plow may be regulated, or the inclination of the furrow-wheel may be varied. When the box B has been elevated as far as possible, the ground-wheels are vertical, and the plowshare is raised to its utmost, this being the position of parts in driving to and from the field, as shown in Fig. 4. To change the height of the plowshare, the engagement of the spring-latch with the teeth of sector H² is unchanged, this engagement preferably being somewhat about the middle of the sector; but the lever, as now arranged, has the effect of being an integral part section F of the crank-axle, for it has very little effect upon the inclination of the furrow-wheel; but the elevation of the plowshare is entirely dependent upon its movement, and just here the object of the ratchet-teeth $h^5$ on the rigid sector H' is made apparent, for, as shown, they are on the rear portion of the sector, where the most changes are produced. By means of them the lever may be quickly lowered at any time without touching the finger-levers, and especially where a sudden exigency arises—such as avoiding a stone or stump—the plow being thrown out of the earth by simply lowering the lever without touching the finger-levers, owing to the ratchet-teeth. The foot-lever G now comes in play. By depressing it assistance is afforded in raising the plow out of the ground. So much for the operation of raising or lowering the plow. The inclination of the furrow-wheel is regulated by the engagement of the other spring-latch with the teeth of sector H². The normal position of this wheel, due to the connection of parts, is inclined to its fullest extent, and that takes place when the forward edge of the sector H² is in contact with the laterally-projecting lug on sector H'. This position is assumed automatically when the latch is withdrawn from the teeth of sector H², owing to the weight of the machine. To take a new hold, the hand-lever must be moved forward, both finger-levers being held until the proper bite is obtained upon the sector, when the finger-levers are released and the latches lock the lever to the sectors, one or both, accordingly as one or both finger-levers are released. At first blush it would appear as though this smaller sector, H², was useless; but its object is to regulate the inclination of the furrow-wheel for all ordinary adjustments relative to the ratchet-teeth $h^5$, or, in other words, so that the greater part of the changes may be made without any engagements with the rack-teeth of the rigid sector, it being much more convenient to operate upon the ratchet-teeth. Of course for extreme adjustments or extreme depths of cut the rack-teeth necessarily come in play. A great many different adjustments may be made; but, as an example of one, suppose the sector H² to be in its extreme forward position and the latch in its rear notch. In this position the plow can be lowered but very slightly, while the furrow-wheel is at its maximum degree of inclination. Now withdraw both latches and move the lever forward as far as possible. The inclination of the furrow-wheel remains unchanged, but the depth of plow is at its maximum. So it is seen that to plow the greatest depth, and at the same time have the greatest inclination of the furrow-wheel, this adjustment is necessary.

The block B is held in place upon the beam by means of a saddle, L. The interior of this saddle is made to conform to the shape of the block, and it is adapted to straddle the latter. The edges of the saddle are provided with flanges $l$, having bolt-holes $l'$ therein, and on the lower side of these flanges lugs $l^2$ project in pairs, they being adapted to receive the beam between them; and here it may be mentioned that while these lugs prevent a lateral movement of the saddle independently of the beam in regulating the position of the carriage or crank axle they do admit of a forward and backward movement of the beam. The saddle can, however, be adjusted laterally on the block B by loosening the clips which bind the saddle, beam, and block together. Clips $l^3$ bind the saddle to the plow-beam, and to effect either of these changes in the position of the carriage—i. e., backward or forward, or to the right or left—nuts $l^4$ on the clips are loosened until the proper position is reached, when they are again tightened.

On one side of the saddle a semicircular vertical recess, $l^5$, is formed, this recess being designed to receive the stem on which the sod-cutting disk L' is revolubly supported. This stem may be raised or lowered, as required, by loosening the binding-clip $l^6$. The cutting-disk is of ordinary construction and supported between the parts of a bifurcated arm, $L^2$, which latter is supported on the stem. The arm is held on by a collar, $L^3$, a set-screw, $l^7$, holding it on the stem.

The saddle L is provided on its top with a lug, $L^{13}$, and through the latter a hole, $l^8$, is formed. To this lug a tongue-supporting arm, M, is pivoted, and on the forward end of this arm a tongue-socket, M', is pivoted. The rear end of this socket is rounded and provided with a notch, $m$. A spring-actuated sliding latch, $m'$, is held in straps $m^2$ in position to enter the notch $m$ when the latter is in position to receive it. From this latch a controlling-rod, $M^2$, extends back, passing through an eyelet, $m^3$, in the rear of the arm M. The tongue may be used or not; but when not used the arm is removed and the same means is employed for the attachment of the draft-animals—such, for instance, as that shown, where a plate, $M^3$, is bolted and braced to the nose of the beam. This plate is provided with a double row of perforations, $m^4$, adapted to receive the bolt $m^5$ and key $m^6$, which hold the clevis-plate to the perforated plate. The clevis-plate is also provided with a row of holes adapted to receive the clevis-bolt. By this construction the draft may be shifted laterally or vertically.

The plow proper, consisting of the moldboard, landside, and point, of ordinary construction, is attached to the standard A' by bolts or other approved means. The portion which is attached to the standard projects upwardly to a point about on line with the beam, and the upper end of this arm N is provided with a bolt-socket, N', while at the very top of the arm a flange, $n$, is formed. A swinging bracket, $N^2$, is pivotally supported on a bolt, $n^2$, passed through holes in the arms $n^3$ $n^4$ of the bracket above and below the socket and through the socket. The arms of this swinging bracket merge at the rear into a hollow cylindrical sleeve, $N^3$. In this sleeve the stem $n^5$ of a bifurcated arm, $N^4$, is loosely supported. Caster-wheel $N^5$ is straddled by the parts of this arm and journaled on a spindle in their ends. Cups $N^6$, affixed to these branches, receive the hubs of the caster-wheel. To the upper end of the stem $n^5$ an operating-arm, $N^6$, is held by a set-screw or similar means, and extending downwardly from one end of this arm is a mud-scraper, $N^7$, the end of which rests in proximity to the tire of the wheel for removing the mud therefrom. A row of crown-teeth, $n^6$, project upwardly from the upper arm, $n^3$, of the swinging bracket, and a gravity-latch, provided with a handle at one end and a tooth on the lower side for engagement with the crown-teeth, is pivoted to the forward end of the operating-arm $N^6$. Through this mechanism the fine adjustments of the caster-wheel are accomplished—such as varying the width of the furrow-cut. The edge of the upper arm, $n^3$, of the swinging bracket is rounded and provided with a notch, $n^7$, adapted to be engaged by a spring-actuated catch, O, in order to hold the bracket rigidly in place. This catch and its surrounding spiral spring are located in a box, O', in front of the bracket, and a lever, $O^2$, is pivoted to a post projecting from the bolt. In close proximity to the pivotal point this lever is provided with an elongated cam-slot, $o$, which receives a pin, $o'$, projecting laterally from the spring-box. Normally the lever is about horizontal, the bolt is in engagement with the notch $n^7$, and the position of the pin $o'$ is in the forward end of the cam-slot, so that when the lever is depressed by the operator's foot being placed upon the tread $o^2$ the cam-slot $o$ serves as a movable fulcrum for the lever, thus drawing the pivotal end of the lever with its bolt forward, while the free end is lowered. By this means the catch is withdrawn from the notch. The spring automatically returns the catch and raises the lever. The object of this mechanism is to allow the whole bracket to swing, thereby assisting the turning of the plow. In order that the tongue, when one is employed, and the caster-wheel may be released at once and made to turn simultaneously, a link, O³, loosely connects the controlling-rod M² with lever O². To compensate for a forward or backward shift of the carriage, this lever is provided with a slot, o³, almost throughout its entire length, in which the wrist o⁴ is adjusted. The link O³ is provided with an eyelet which is looped over the wrist and secured in place by a washer and nut. The edges of the wrist lap over the lever to permit it to slide easily thereon when the adjustment is changed.

The seat-frame P is loosely connected at one end to the section F of the crank-axle, and from this point it extends backward about parallel with the plow-beam to a point where it is supported upon an arm, P′, which projects laterally from the upright arm N, to which it is rigidly secured. The rear end of this seat-frame is provided with an elongated slot to admit of the frame being slid with the carriage in the event that the position of the latter is changed. A bolt or similar means, passed through a hole in the arm P′ and through the elongated slot, holds the arm and seat-frame together in whatever position the carriage is placed. A foot-rest, Q, projects below the seat-frame.

In the modification a yoke, R, is formed integral with one end of the box B, and one end of this yoke is restricted into a hollow tapering box, R′. In this box one end of the crank-shaped arm R², or section of the crank axle, is loosely supported. This arm is formed into a skein, R³, on which the furrow-wheel E is supported in the usual fashion. A notched ring, r, is slipped over the end of the skein and a pin, r′, inserted through the notches, and a hole in the skein holds the ring over the end of the hub. A portion of the hub is screw-threaded to receive a cap, R⁴, which is screwed thereon over the end of the skein and ring.

A section, F, of the crank-axle is supported in box B, and on its outer end an arm, R⁵, is held by a set-screw, r², or similar means. A skein is held in the lower end of this arm, and one of the ground-wheels E′ is mounted upon the skein. The skein is preferably secured to the arm by means of a set-screw. The skein in this case is extended inwardly a short distance to receive the foot-rest S, the latter being held on by a nut and washer preferably, and to this foot-rest the end of the seat-frame P may be fastened. The principal differences between this construction and the one just described exists in the yoke and the mechanism now to be described.

A sector, T, spans the yoke R, to which it is rigidly secured in a vertical position. This sector is provided on its rear edge with ratchet-teeth t, and a series of holes, t′, are adapted to receive a bolt, r², which holds an adjustable toothed sector, T′, to the rigid sector. Said adjustable sector is provided with an elongated curved slot, whereby a very fine adjustment may be given. A hand-lever, T², is held loosely on the inner end of the section, and integral with one side of this lever, near its pivotal point, a segment, T³, is formed, and projecting from the other side of the lever, back of the segment, is a lug, t³, which extends loosely through the hole in a shoe, Y, secured to the inner end of the section R² of the crank-axle, so that the said section together with the furrow-wheel are moved by the change in position of this lever T², the latter being locked to the sector T by a spring-latch, t⁴. A second lever, U, the one which operates the rock-shaft, is loosely mounted on the rock-shaft adjacent to segment T³, and this lever is provided with a spring-latch, u, adapted to engage the teeth of the segment, and be confined in its swings by the ears u′ on the ends of said segment. A lock-plate, V, is provided with an angular opening at one end, which receives an angular portion of the section F of the crank-axle, and this plate lies flat against the lever U with a pair of ears, v, overlapping the edges of the latter. A square post, v′, on the back of this plate receives the convolute spring W, and is locked thereon by a nut, w. The other end of this spring bears on the rear edge of the lever U. It is apparent from the construction that these two levers are in effect one, as in the other construction, for the reason that one is or may be locked to the other. Of course the lever T, as above mentioned, is designed especially for regulating the inclination of the furrow-wheel, while the lever U is for raising or lowering the plowshare. The box B is held on the beam by a saddle, L, as in former construction. The other parts are the same.

Figure 15:
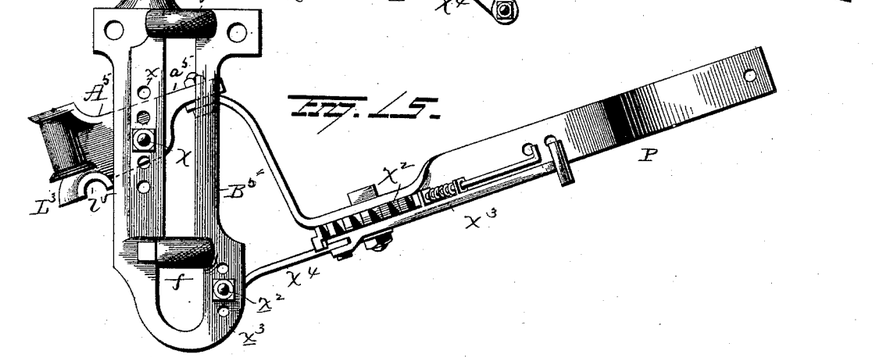
Figs. 15, 16, and 17 are views of an attachment for swinging the wheels forward or backward.
Figures 16, 17:
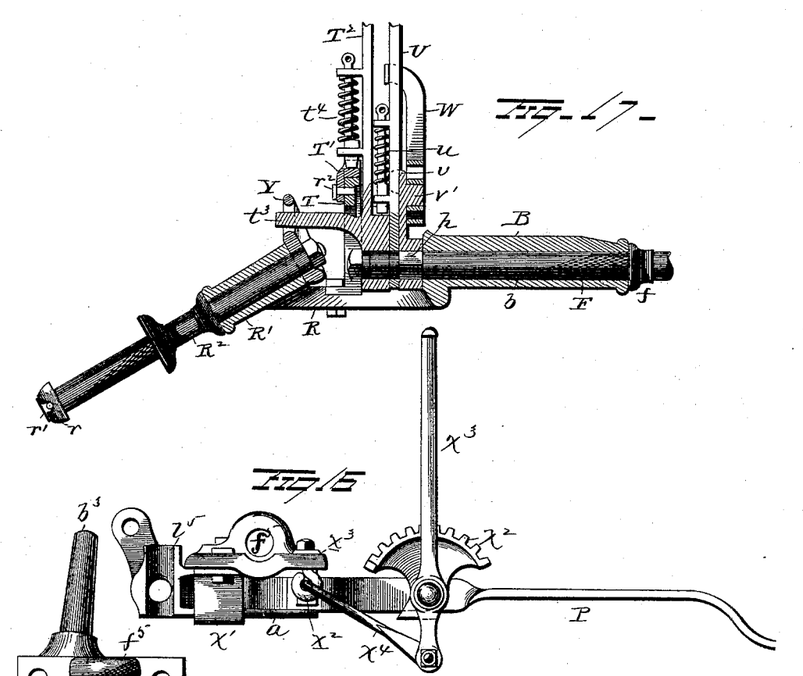

The attachment shown in Figs. 15 and 16 is designed for a special purpose, and may be used or not, its object being to throw the plow in and out to regulate the width of furrow-slice in straightening the furrow or turning around obstacles, such as stones and stumps, without the necessity of turning the draft-animals to the side. In this attachment A⁵ represents a block having one flat side, a⁵, designed to be clamped to the side of the plow-beam. This block serves the same purpose as the saddle L in the main construction to fasten the carriage to the beam. The block is provided with a lug, L³, to which the tongue-arm is pivoted, and on one side with the semi-circular recess l⁵ for receiving the stem of the sod-cutting disk. The frame B⁵ is of skeleton formation, to make it comparatively light, and provided with a row of five or six holes, x, through which a king-bolt, X, is adapted to extend to hold the frame to the block A⁵. A strap-plate, X′, extends beneath this block A⁵, and is also provided with an equal number of holes, through which the lower end of the king-bolt extends. By means of these holes the frame is shifted laterally upon the block. The frame B⁵ is provided also with sockets f⁵ for the support of a section of the crank-axle. Projecting from one end is the tapering skein b³. The seat-frame P is held by a bolt, p, to the rear end of block A⁵, it taking a lateral bend to bring it in proper position. A sector, $X^2$, is secured to this seat-frame, and on the outer end of the bolt, securing the sector to the frame, a hand-lever, $X^3$, is pivoted. Said lever is provided with the usual means for locking it to the sector, and the lower end extends below its pivot or fulcrum, where it is pivotally connected by a link, $X^4$, to the eye-screw $x^2$, which latter is held in one of the holes $x^3$ in the frame B.

It is to be observed that the lever is in position to be manipulated by the left hand of the driver, the other levers all being to his right. Now by giving the lever its extreme forward adjustment the plow is made to cut a wider slice. By the opposite adjustment the plowshare is turned out of the furrow. Of course any immediate adjustments may be made.

Having fully described my invention, what I claim as new, and desire to secure by Letters Patent, is—

1. In a sulky-plow, the combination, with a sectional crank-axle, and wheels and plow-beam secured to the axle, of lever mechanism for moving the wheels forwardly and rearwardly relative to the point of attachment of the beam to the axle and for inclining one of said wheels, substantially as set forth.

2. In a plow, the combination, with a beam, an axle, and wheels, of a lever for moving one or both of the wheels relative to the axle and regulating the inclination of one wheel.

3. In a plow, the combination, with a beam, an axle, and wheels, of a hand-lever for moving one or both of the wheels to raise or lower the plowshare and change the inclination of one wheel, and a foot-lever adapted to act in conjunction with the hand-lever.

4. In a plow, the combination, with a beam, a crank-axle, and wheels, of a single hand-lever for adjusting the crank-axle, whereby the plow is raised and lowered and also for changing the angle of the furrow-wheel relative to the axle.

5. In a plow, the combination, with a crank-axle made in sections, a box mounted thereon and carrying the plow-beam, and wheels mounted on the ends of the axle, of a hand-lever rigidly secured to one section of the axle and detachably connected to the other section, and devices for locking the lever to the box, substantially as set forth.

6. In a plow, the combination, with a box and an axle mounted thereon, of a saddle adapted to be adjusted laterally on the box, and a plow-beam adjustably secured to the saddle, substantially as set forth.

7. In a plow, the combination, with a crank-axle, a saddle adapted to be adjusted laterally thereon, a plow-beam secured in the saddle and adapted to be adjusted longitudinally therein, and wheels on the ends of the crank-axle, of a single hand-lever for raising and lowering the crank-axle and attached plow-beam and for varying the inclination of the furrow-wheel.

8. In a plow, the combination, with a beam, a swivel caster-wheel, and adjustable tongue, of means for locking said wheel and tongue in alignment with each other and means for breaking the locks simultaneously, substantially as set forth.

9. In a plow, the combination, with a beam, a swivel caster-wheel at one end and a jointed tongue at the other, of devices for locking said wheel and tongue in alignment, and a link connecting said devices whereby the two locking devices may be drawn simultaneously.

10. In a plow, the combination, with a crank-axle made in sections and wheels journaled on said axle, of foot and hand levers rigidly secured to one of said sections, the hand-lever being detachably connected to the other section.

11. In a plow, the combination, with a sectional crank-axle and a box mounted thereon, of a saddle adjustably secured to the box and a plow-beam adjustably secured to the saddle.

12. In a plow, the combination, with a beam, a sectional crank-axle, a box thereon, and saddle for securing the beam to the box, of a sector fixed to the box, a sector loosely mounted on one section of the axle and connected to the other, and a lever secured to one section of the axle and adapted to be detachably connected to the loose sector.

13. In a plow, the combination, with a crank-axle, of a box journaled thereon, a saddle adapted to be adjusted laterally on the box, and a plow-beam adapted to be adjusted longitudinally in the saddle, the saddle, box, and beam being secured together by one set of clips or bolts, substantially as set forth.

14. In a plow, the combination, with an axle and a box thereon, of a laterally-adjustable saddle secured on the box, a sod-cutter carried by the saddle, and a plow-beam secured to the saddle, substantially as set forth.

15. In a plow, the combination, with an axle, a box, a saddle adjustably secured thereto, and a beam secured to the saddle, of a tongue-supporting arm pivoted to the saddle and a tongue-socket pivoted to said arm, and means for locking the arm and socket together.

16. In a plow, the combination, with a beam, a saddle having lugs on its lower face to straddle the beam and admit of longitudinal adjustment thereon, and clips for holding the saddle, of a tongue-arm pivoted to the saddle, a tongue-socket pivoted on the forward end of the arm and having a rounded notched rear end, a spring-latch adapted to engage said notch, and means for withdrawing the latch, substantially as set forth.

17. In a plow, the combination, with a sectional crank-axle, and wheels journaled thereon, of a foot-lever adjustably secured to one of said sections, and a hand-lever secured to the same section and detachably connected to the other section, substantially as set forth.

18. In a plow, the combination, with a section of a crank-axle, a box mounted on said section and provided with an inclined projection, and a section of the axle loosley mounted on the projection, of a rigid sector, a loose sector connected to the section of the axle having the inclined projection, a hand-lever, and means for locking same to either sector, substantially as set forth.

19. In a plow, the combination, with an axle having spindles, and sleeves loosely mounted on said spindles and provided with screw-threaded outer ends, of keys for locking the sleeves on the spindles, and wheels secured to the sleeves and caps covering the keys and ends of the spindles and secured to the screw-threaded ends of the sleeves, substantially as set forth.

20. In a plow, the combination, with a crank-axle, wheels and plow-beam secured to said axle, of a rearwardly-extending seat-frame secured to the axle and to the plow-standard, substantially as set forth.

21. In a plow, the combination, with a beam and a plow proper having an integral upwardly-projecting arm, of a swinging bracket, a caster-wheel pivotally supported in this bracket, means for locking the wheel-support to the bracket in different positions, and a draw-bolt for locking the swinging bracket, substantially as set forth.

22. In a plow, the combination, with a beam and a plow proper secured thereto, and having an upwardly-projecting arm, of a swinging bracket having crown-teeth on its upper arm and a notch forward of these teeth, a bifurcated arm pivotally supported in the bracket, a wheel journaled between the branches of said arm, an arm secured to the bifurcated arm and carrying a mud-scraper, and a gravity-latch adapted to engage the crown-teeth on the swinging bracket, and a spring-actuated draw-bolt for locking the swinging bracket, substantially as set forth.

23. In a plow, the combination, with a beam and a plow proper, of a swinging bracket swiveled thereto, a spring-actuated draw-bolt for locking said bracket, and a lever having a cam-slot, with which the bolt has engagement for withdrawing the bolt, substantially as set forth.

24. In a plow, the combination, with a beam, a plow proper, and a tongue-supporting arm and pivoted socket and device for locking said socket, of a swinging bracket, a draw-bolt for locking the bracket, a lever having a cam-slot with which the draw-bolt has engagement, an adjustable wrist on the lever, and a link connecting said wrist and the device which locks the pivoted socket to the tongue-supporting arm, whereby the two locking devices may be unlocked simultaneously, substantially as set forth.

25. In a plow, the combination, with a crank-axle, a box thereon, and a saddle mounted on the box, of a beam adjustably secured to the saddle, and a seat-supporting frame mounted on the axle and adjustably secured to the plow, substantially as set forth.

In testimony whereof I have signed this specification in the presence of two subscribing witnesses.

CHARLES ANDERSON.

Witnesses:
F. C. NIPPOLD,
G. BRUCE HORTON.